(12) United States Patent
Tomaka

(10) Patent No.: US 7,404,266 B2
(45) Date of Patent: Jul. 29, 2008

(54) PORTABLE FILM VIEWER

(75) Inventor: Jeffrey Stephen Tomaka, New York, NY (US)

(73) Assignee: Ha-Lo Promotions Acquisition Corporation, Northbrook, IL (US)

( * ) Notice: Subject to any disclaimer, the term of this patent is extended or adjusted under 35 U.S.C. 154(b) by 0 days.

(21) Appl. No.: 10/693,212

(22) Filed: Oct. 24, 2003

(65) Prior Publication Data

US 2005/0086840 A1 Apr. 28, 2005

(51) Int. Cl.
G02B 27/02 (2006.01)
(52) U.S. Cl. .......................................... 40/367; 24/67.3
(58) Field of Classification Search ........... 40/361–367; 362/98–99; 24/67.3; 281/42, 45, 51
See application file for complete search history.

(56) References Cited

U.S. PATENT DOCUMENTS

| | | | | |
|---|---|---|---|---|
| 1,320,537 A | * | 11/1919 | Dimond | 362/99 |
| 2,380,267 A | * | 7/1945 | Ruth | 83/521 |
| 2,396,121 A | * | 3/1946 | Patino | 455/351 |
| 2,755,585 A | * | 7/1956 | Lubow | 40/367 |
| 4,118,654 A | | 10/1978 | Ohta et al. | |
| 4,140,377 A | | 2/1979 | Hoadley | |
| 4,164,822 A | * | 8/1979 | Batton | 40/361 |
| 4,184,194 A | | 1/1980 | Shofu | |
| 4,194,635 A | | 3/1980 | Ferrara | |
| 4,335,421 A | * | 6/1982 | Modia et al. | 362/223 |
| 4,510,708 A | * | 4/1985 | Pokrinchak | 40/361 |
| 4,751,620 A | * | 6/1988 | Wright et al. | 362/99 |
| 4,879,604 A | | 11/1989 | Koshiyouji | |
| 4,895,231 A | * | 1/1990 | Yamaguchi et al. | 190/115 |
| 4,908,876 A | | 3/1990 | DeForest et al. | |
| 4,996,785 A | | 3/1991 | Cicenas | |
| 4,996,786 A | * | 3/1991 | Shoenfeld | 40/361 |
| 5,174,607 A | | 12/1992 | Hill | |
| 5,245,539 A | | 9/1993 | Romeas et al. | |
| 5,287,254 A | * | 2/1994 | Solman | 362/98 |
| 5,337,224 A | | 8/1994 | Field et al. | |
| 5,607,223 A | | 3/1997 | Brotz | |
| 6,031,516 A | | 2/2000 | Leiper | |
| 6,088,941 A | | 7/2000 | Inbar et al. | |

(Continued)

FOREIGN PATENT DOCUMENTS

DE 3843343 A * 6/1990

(Continued)

*Primary Examiner*—Cassandra Davis
(74) *Attorney, Agent, or Firm*—John S. Paniaguas; Katten Muchin Rosenman LLP

(57) ABSTRACT

A portable x-ray viewer is configured as a clipboard. The clipboard configuration makes the portable x-ray viewer easy to handle by doctors and other medical personnel. Since the viewer is portable, the number of required x-ray viewers in a doctor's office or a medical facility is greatly reduced, thus reducing the overall cost. In addition, the portable x-ray viewer is provided with an automatic control for controlling the viewer. In particular, in accordance with an important aspect of the invention, the viewer is automatically turned on when an x-ray is inserted and is automatically turned off when the x-ray is removed. As such, use of the x-ray viewer is facilitated for medical personnel and also eliminates the problem of premature burnout of the display or lamp when the x-ray viewer is left on for extended periods of time.

6 Claims, 7 Drawing Sheets

U.S. PATENT DOCUMENTS

| | | |
|---|---|---|
| 6,208,437 B1 | 3/2001 | Neushul |
| 6,462,868 B1 | 10/2002 | Giesberg et al. |
| 6,548,823 B2 | 4/2003 | Nagatsuka et al. |
| 2002/0030989 A1 | 3/2002 | Stephen |

FOREIGN PATENT DOCUMENTS

| | | |
|---|---|---|
| JP | 07306378 A * | 11/1995 |
| WO | WO 01/22782 A1 | 3/2001 |

* cited by examiner

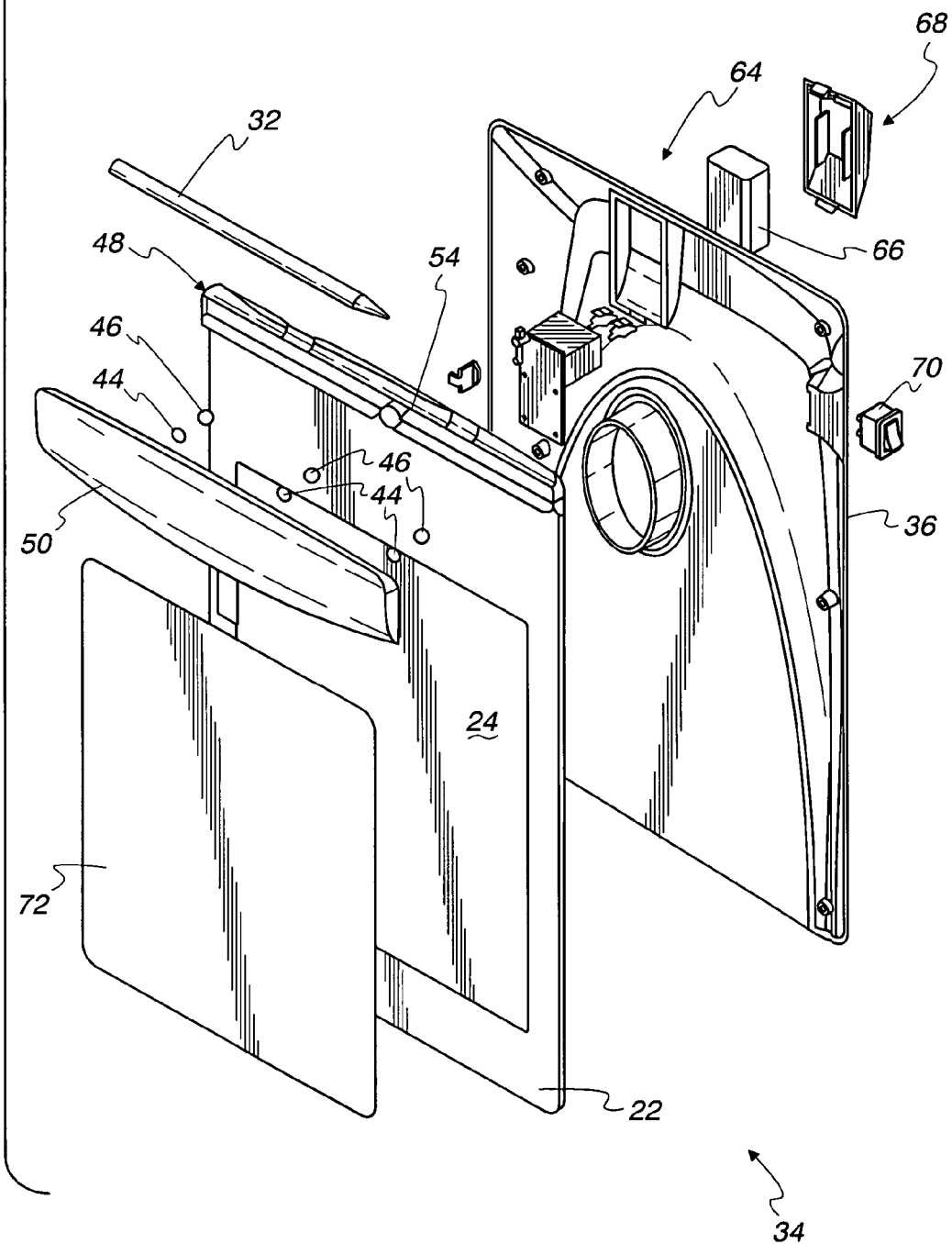

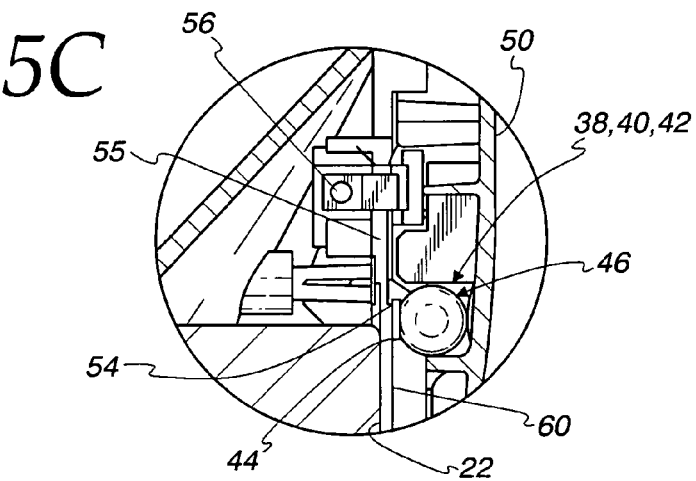
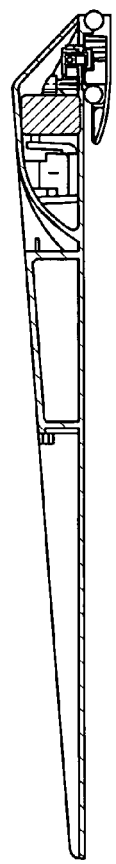
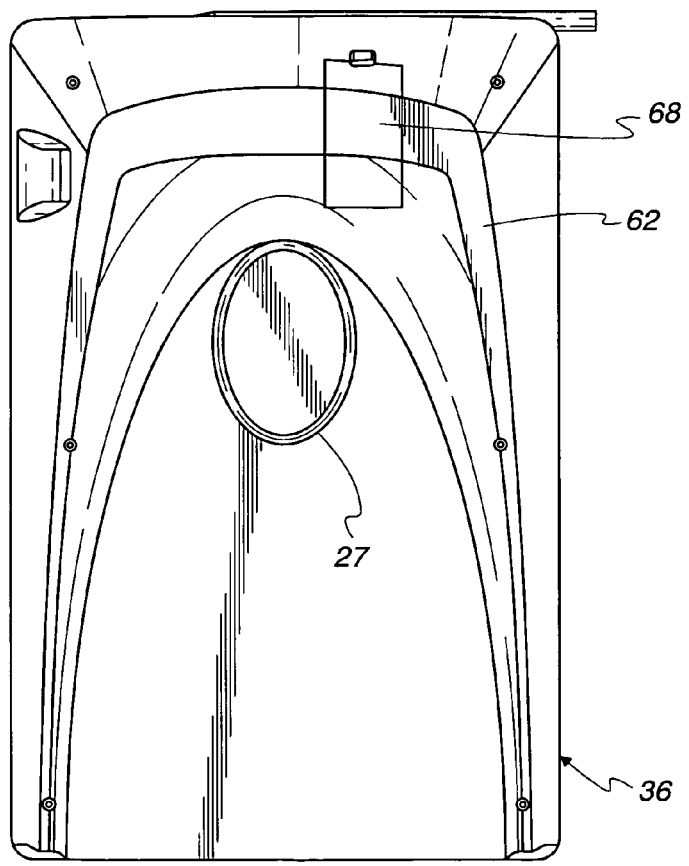

PORTABLE FILM VIEWER

BACKGROUND OF THE INVENTION

1. Field of the Invention

The present invention relates to a film viewer and more particularly to a portable film viewer configured as a clipboard with an automatic control circuit which automatically turns the viewer on when a hard copy film is inserted and automatically turns the viewer off when the film is removed.

2. Description of the Prior Art

Film viewers, such as x-ray viewers, are generally known in the art. Such x-ray viewers are known to be used in the medical industry by medical personnel to view x-ray films. Examples of such x-ray viewers are disclosed in U.S. Pat. Nos. 4,118,654; 4,510,708; 4,908,876; 6,031,516; 6,088,941; 6,208,437; 6,462,868; and 6,548,823. X-ray viewers are also known for viewing digital x-rays. U.S. Pat. Nos. 6,031,516 and 6,462,868 disclose dual-function x-ray viewers that are configured to view both hard copy x-ray films as well as digital x-rays.

In the medical industry, hard copy x-ray films are predominately used. Such x-ray film viewers are normally wall-mounted and include a lightbox. One known conventional viewer includes a light source or lamp, a reflector plate, and a diffuser plate. The lamp and the reflector plate are disposed adjacent a rear wall of the light box. The diffuser plate forms the front wall of the lightbox. The diffuser plate causes relatively uniform light to be distributed across its surface to allow relatively accurate reading of the x-ray film. An example of such an x-ray viewer is disclosed in U.S. Pat. Nos. 4,118,654 and 4,510,708.

There are several problems with such known x-ray viewers. First, in many medical applications, such as doctors' offices, such x-ray viewers are required in each of the patient examination rooms—especially in patient examination rooms of orthopedic surgeons. By having an x-ray viewer in the patient examination rooms, the orthopedic surgeon is able to show patients the exact nature of their problem. However, such x-ray viewers are relatively expensive. Thus, separate x-ray viewers in each patient examination room can be costly for a doctor.

Another problem with known x-ray viewers is that the light or display must be controlled manually by the medical personnel, which is cumbersome. Additionally, medical personnel are known to leave the lamp or display on for extended periods of time. Accordingly, the lamps and displays are known to burn out prematurely, thus increasing the cost to the medical facility. Thus, there is a need to reduce the cost of such x-ray viewers.

SUMMARY OF THE INVENTION

Briefly, the present invention relates to a portable film viewer configured as a tabletop clipboard device with a handle. The handle and the clipboard configuration make the portable film viewer easy to handle by doctors and other medical personnel. Since the viewer is portable, the number of required film viewers in a doctor's office or a medical facility is greatly reduced, thus reducing the overall cost. In addition, the portable film viewer is provided with an automatic control circuit for controlling the light source in the viewer. In particular, the automatic control circuit automatically turns the film viewer on when a hard copy film is inserted and automatically turns off the film viewer when the film is removed. As such, use of the film viewer is facilitated for medical personnel and also eliminates the problem of premature burnout of the display or lamp.

DESCRIPTION OF THE DRAWINGS

These and other advantages of the present invention will be readily understood with reference to the following drawings and attached specification wherein:

FIG. 3 is an exploded perspective view of the film viewer in accordance with the present invention.

FIG. 5A is a back view of the film viewer in accordance with the present invention.

FIG. 5B is a sectional view of the right side of the film viewer in accordance with the present invention.

FIG. 5C is a detailed view of a portion of the film viewer, illustrating a contact switch and film grip in accordance with the present invention.

DETAILED DESCRIPTION

The present invention relates to a portable film viewer, for example, an x-ray viewer. In order to facilitate handling of the portable film viewer, the device includes a handle and is configured as a clipboard. In addition, a slot for carrying a marking pencil commonly known as a so-called "China marker". In order to further facilitate use of the film viewer in accordance with the present invention, the film viewer is provided with a control circuit, which automatically turns on the film viewer when an x-ray film or other hard copy film is inserted into a film grip. The automatic control circuit also automatically turns off the film viewer when the hard copy film is removed from the film grip.

The portable film viewer is described and illustrated herein for use in medical applications for viewing x-ray films in the medical industry. It is to be understood that the principles of the present invention are also applicable to other applications, such as dental x-rays and industrial x-rays. Furthermore, it is to be further understood that the portable film viewer in accordance with the present invention can also be used with other hard copy films, other than x-ray films.

Figure 1:
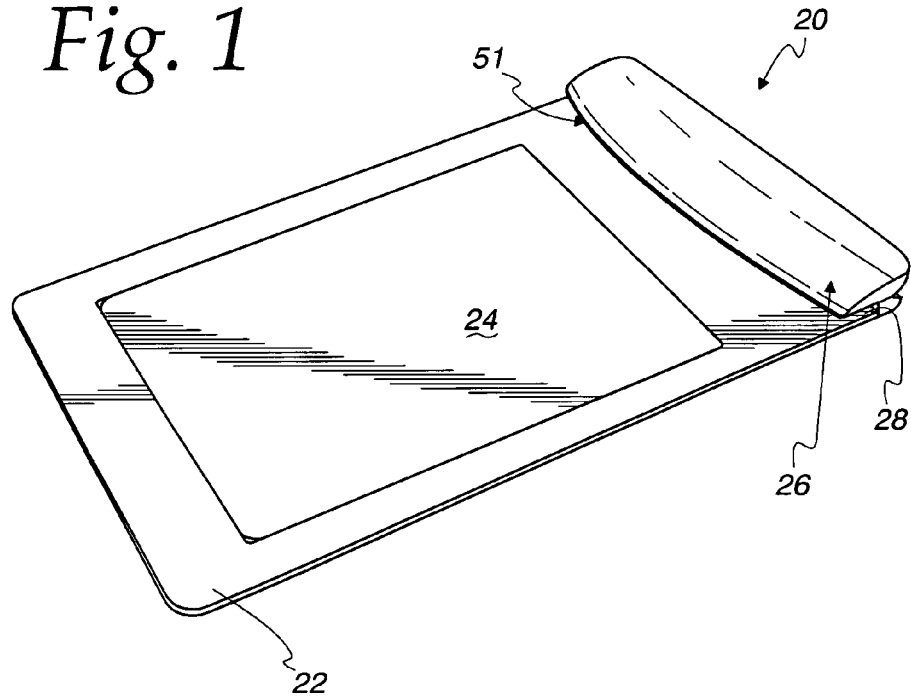
FIG. 1 is a perspective view of a portable film viewer in accordance with the present invention.

Referring to the drawings, the portable film viewer in accordance with the present invention is generally identified with the reference numeral 20. As shown in FIG. 1, the portable film viewer 20 in accordance with the present invention includes a front panel 22, a viewing window 24, and a film grip assembly 26. The film grip assembly 26 includes a notch 28 for receiving hard copy films (not shown), such as x-ray films. As will be discussed in more detail below, the film grip assembly 26 includes an automatic control circuit for automatically turning on the viewer when hard copy film is inserted therein and shutting the viewer 20 off when the hard copy film is removed.

Figure 2:
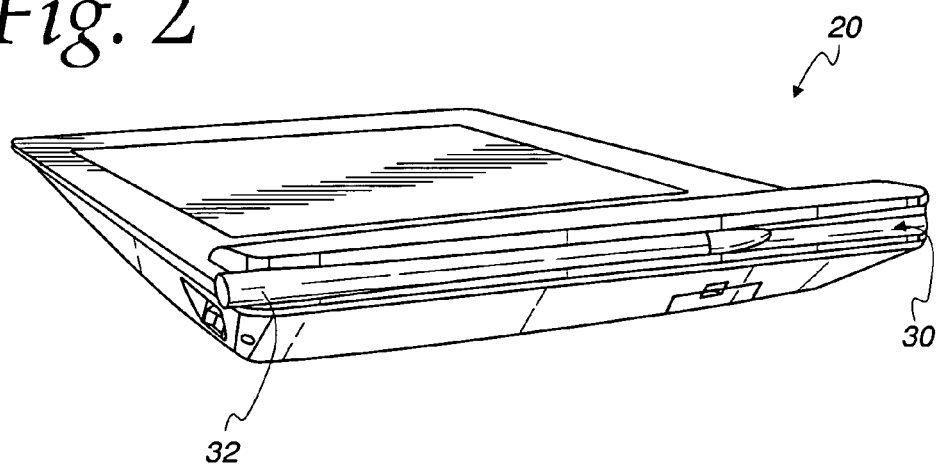
FIG. 2 is another perspective view, illustrating a top portion of the portable film viewer, formed with a slot for carrying a marking pencil.
Figure 4A:
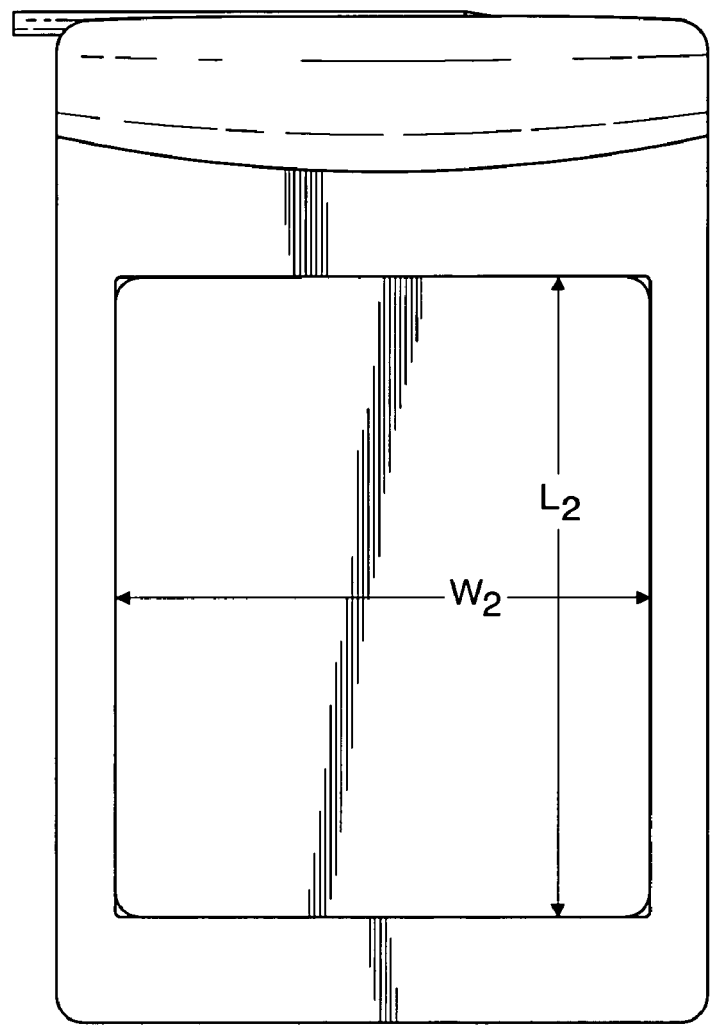
FIG. 4A is a front view of the film viewer in accordance with the present invention.
Figure 4B:
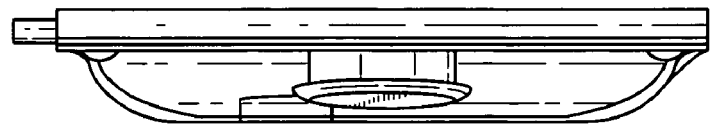
FIG. 4B is a bottom view of the film viewer in accordance with the present invention.
Figure 4C:
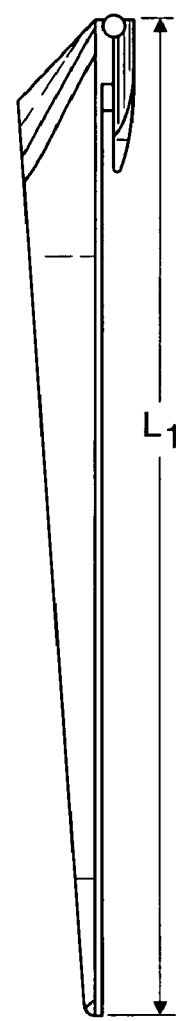
FIG. 4C is a left side view of the film viewer in accordance with the present invention.
Figure 4E:
FIG. 4E is a right side view of the film viewer in accordance with the present invention.
Figure 4D:
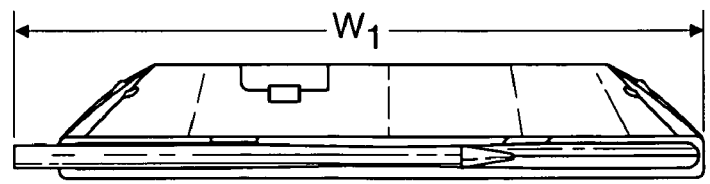
FIG. 4D is a top view of the film viewer in accordance with the present invention.
Figure 6:
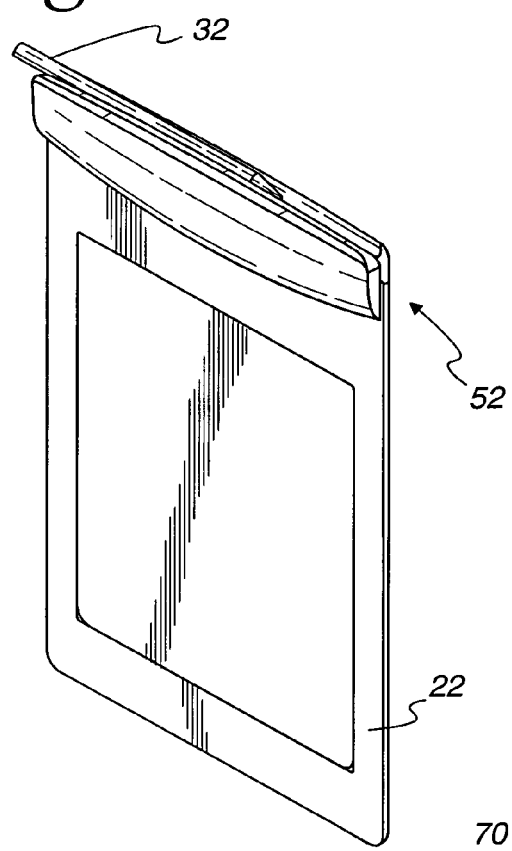
FIG. 6 is a perspective view of a front portion of the film viewer in accordance with the present invention.
Figure 7:
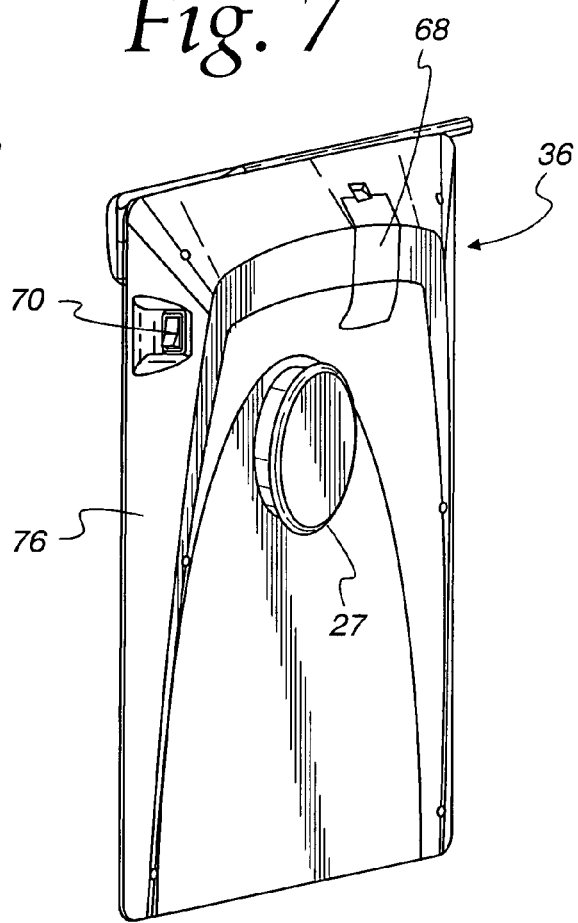
FIG. 7 is a perspective view of the back of the film viewer in accordance with the present invention.

As shown best in FIGS. 5A and 7, a handle or knob 27 may be provided to facilitate handling of the device 20. An exemplary oval knob is illustrated. However, other types of handles are contemplated, such as a circular knob, as well as non-circular knobs or handles of virtually any configuration. The portable film viewer 20 is configured to rest on a flat surface, such as a tabletop, as shown in FIGS. 1 and 2. The knob 27 facilitates handling of the viewer 20 when it is not resting on a flat surface. In particular, the knob 27 facilitates a user holding the viewer 20 in one hand and while marking on the film with the other hand. The knob 27 may be configured to either be concealed from view when the film viewer 20 is resting on a flat surface or alternatively exposed.

In order to further facilitate the use of the portable film viewer 20, a transverse slot 30 (FIG. 2) is provided along a top portion of the portable film viewer 20. The width of the slot 30 is configured to receive a conventional marking pencil 32, known as a so-called "China marker". Such marking pencils 32 are often used by medical personnel to highlight portions of an x-ray film.

As shown in the Figures, the portable film viewer 20 is configured as a clipboard and is rather compact in size. For example, with reference to FIGS. 4A through 4E, the portable film viewer 20 may be configured with a length L1 of around 400 mm and a width W1 of about 230 mm. With such a configuration, the viewing window 24 may be configured with a length L2 of about 230 mm and a width of about 190 mm. The overall depth W3 of the portable viewer 20 may be about 40 mm and have an overall weight of around 18 ounces.

The portable viewer 20 may be configured in the shape of a clipboard and formed with a molded plastic housing 34 (FIG. 3). The molded housing 34 includes a front panel 22 configured with the viewing window 24 and a rear panel 36, as generally shown in FIGS. 3, 5A, and 7.

The front panel 22 includes a viewing window 24. A flange 48 is formed on the top of the front panel 22. A separate top plate 50 forms a portion of the film grip assembly 26. The top plate 50 is connected in a cantilever configuration to the front panel 22 as shown defining a film receiving slot 51 (FIG. 1). In particular, the top plate 50 is formed with a one or more bosses 38, 40, and 42 on its underside. The bosses 38, 40, and 42 are formed as cylindrical members and project outwardly toward the front panel 22 after assembly. The bosses 38, 40, and 42 are for receiving metal balls 44 and biasing springs 46. In a normal position, the metal balls 46 are urged against the front panel 22 under the influence of the biasing springs 46.

Figure 8:
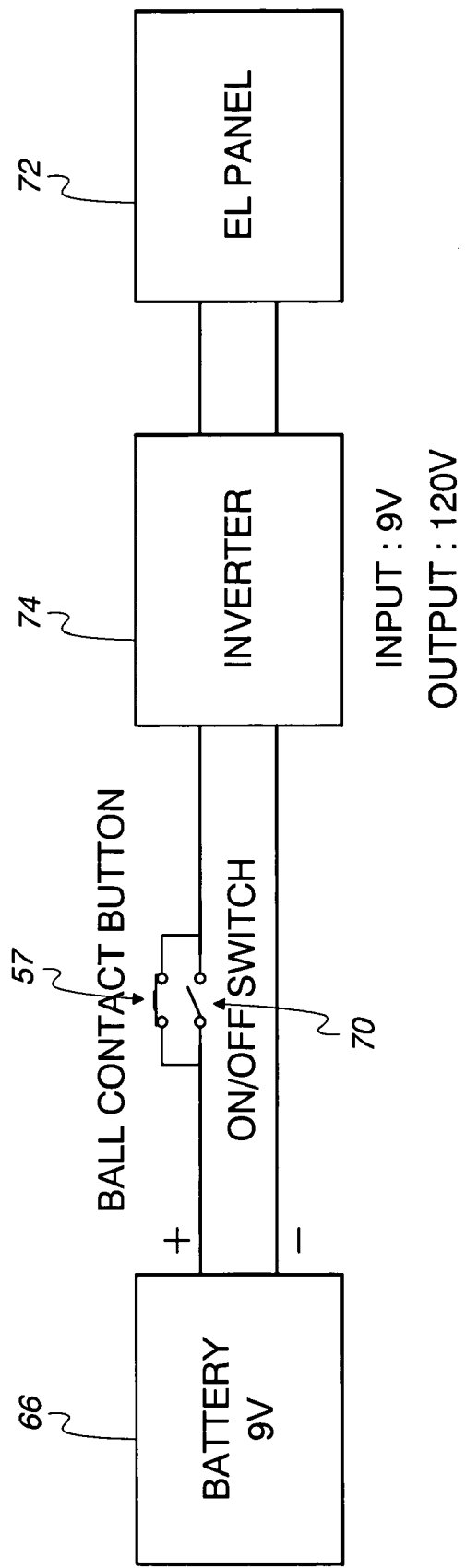
FIG. 8 is a block diagram, illustrating the electrical connections for the film viewer in accordance with the present invention.

A microswitch actuator 54 is formed on one end of a lever arm 55 that is coupled to a momentary action microswitch 56 configured as an automatic control circuit. When a hard copy film 60 is inserted into the film grip assembly 26, the microswitch actuator 54 is depressed which causes the lever arm 55 to change the state of a momentary contact 57 (FIG. 8) within the microswitch 56 to a state opposite to that shown in FIG. 8. In a normal position (i.e. when no film inserted into the film grip assembly 26) and when the film 60 has been removed from the film grip assembly 26, the momentary contact 57 returns to a normally open state as shown in FIG. 8. Other automatic control circuits can also be used. For example, an optical sensor can alternatively be used and configured to interrupt a light beam when a film is inserted.

The back panel 36 forms the base of the portable film viewer 20 and includes a generally C-shaped surface 62 that is configured to enable the portable viewer 20 to rest on a table, cabinet, or the like. A battery compartment 64 may be provided for carrying a battery 66. An access door 68 may also be provided to allow the battery 66 to be replaced from the bottom of the portable viewer 20. An on-off switch 70 may also be provided. The on-off switch 70 is located on a side wall 76 of the rear panel 36.

Various types of illumination devices or lamps may be used for the portable film viewer 20. As shown, and as illustrated herein, an electroluminescent lamp, for example, a model number SH-200-BE, as manufactured by Ping Po Lighting Electronics Factory of TungKuan City, Guangdong, China, may be used for viewing hard copy film, such as x-ray film. Referring to FIG. 8, the electroluminescent display 72 may be powered by an inverter 74, for example, a model no. SH-12-200 manufactured by Shang Hong Factory GuangZhou City, Guangdong, China, and a battery 66, for example, a nine-volt battery. In one exemplary embodiment, the on-off switch 70 is connected in parallel with the momentary contact 57. As shown in FIG. 8, the position of the momentary contact 57 is in a state as shown in FIG. 5C (i.e., an x-ray 60 has been inserted into the film grip assembly 26, tripping the microswitch actuator 54 and closing the momentary contact 57 of the microswitch 56), defining a view mode. When the film 60 is removed from the film grip assembly 26, the microswitch actuator 54 and thus the momentary contact 57 returns to its normal position. As such, assuming the on-off switch 70 is open as shown in FIG. 8, insertion of a film 60 into the film grip assembly 26 causes the momentary contact 57 of the microswitch 56 to close, as shown in FIG. 8, thus providing a closed-current path between the battery 66 and the inverter 74. The inverter 74 converts the nine-volt DC output from the battery 66 to a 120-volt AC output for use with the electroluminescent display 72. When the film 60 is removed from the film grip assembly 26, the momentary contact 57 in the microswitch 56 opens, thus disconnecting the positive terminal of the battery 66 from the inverter 74, which, in turn, turns off the electroluminescent display 72.

The on-off switch 70 may be connected in parallel with the microswitch 56, as shown in FIG. 8. In such a configuration, the on-off switch 70 may be used to connect the battery 66 directly to the inverter 74, irrespective of the state of the momentary contact 57 of the microswitch 56. Assuming the momentary contact 57 is open as shown in FIG. 8, when the on-off switch 70 is open or off, as shown in FIG. 8, the battery 66 is disconnected from the inverter 74, causing the electroluminescent display 72 to be off. During such a condition, when the on-off switch 70 is closed, the positive terminal of the battery 66 is connected to the inverter 74, which, in turn, causes the electroluminescent display 72 to be turned on.

In alternate embodiments of the invention, the portable film viewer 20 may be provided with an electrical cord (not shown) and an electrical plug for direct connection to a 120-volt AC receptacle. In this embodiment, the battery 66 and the inverter 74 would be eliminated. However, the parallel combination of the microswitch 56 and the on-off switch 70 may be connected in series with a line 1 terminal L1 of the 120-volt plug, so that the automatic control of the electroluminescent display 72 operates in the same manner as discussed above.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. A film viewer comprising:
    a portable housing formed with a base and a viewing window for receiving films to be viewed;
    a handle formed in the base of said housing for facilitating handling of said portable housing, said housing being configured so that said handle is concealed when said film viewer is resting on a flat surface;
    a film grip assembly mounted on said portable housing adjacent said viewing window for holding films, wherein said film grip assembly includes a top plate is pivotally connected to the housing in a cantilever configuration defining a film receiving slot, said film grip assembly further including a biasing spring for biasing said top plate toward said housing, said film grip assembly including an actuator in communication with said film receiving slot and responsive to films placed within the film grip assembly, said actuator having a first position when no film is in said film receiving slot and a second position when a film is in said film receiving slot;
    a lamp disposed beneath said viewing window for illuminating said viewing window;
    an electrical power source for providing electrical power to said lamp; and
    an automatic control circuit which includes a microswitch, said microswitch being responsive to said actuator, said microswitch having a first position when there no films in the film grip assembly and a second position when a film is disposed in said film grip assembly, said automatic control circuit causing said electrical power source to automatically turn on said electrical power source when said microswitch is in a first position, and automatically turn off said electrical power source when said microswitch is in said second position, wherein said housing and said clipboard are configured as a clipboard.

2. The film viewer as recited in claim 1, wherein said electrical power source is DC.

3. The film viewer as recited in claim 1, wherein said electrical power source is AC.

4. The film viewer as recited in claim 1, wherein said housing is a molded plastic housing. assembly includes a top plate connected to the housing in a cantilever configuration defining a film receiving slot.

5. The film viewer as recited in claim 1 wherein said top plate includes one or more bosses and said film grip assembly includes one or more balls and one or more springs, said one or more balls received in said one or more bosses with said one or more springs and configured such that said one or more balls are biased toward said housing.

6. A film viewer comprising:
    a housing formed with a base and a viewing window for receiving films to be viewed, said housing configured to rest on a flat surface;
    a film grip assembly mounted on said housing adjacent said viewing window for holding films, said housing and said film grip assembly configured as a clipboard;
    a lamp disposed beneath said viewing window for illuminating said viewing window;
    an electrical power source for providing electrical power to said lamp;
    an automatic control circuit which includes an optical sensor for switching said source of electrical power on whenever a film is disposed on said viewing surface and turning off said source of electrical power when said film is removed; and
    a knob for handling said film viewer, wherein said knob is formed in said base of said housing being configured so that said knob is concealed when said film viewer is resting on a flat surface.

* * * * *